United States Patent
Dewan et al.

(10) Patent No.: US 12,288,410 B2
(45) Date of Patent: Apr. 29, 2025

(54) ACTIVITY CLASSIFICATION USING UNSUPERVISED MACHINE LEARNING

(71) Applicant: SAP SE, Walldorf (DE)

(72) Inventors: Anupam Dewan, Seattle, WA (US);
Mengyuan Liu, Bothell, WA (US);
Weikun Hu, Seattle, WA (US)

(73) Assignee: SAP SE, Walldorf (DE)

( * ) Notice: Subject to any disclaimer, the term of this patent is extended or adjusted under 35 U.S.C. 154(b) by 422 days.

(21) Appl. No.: 17/959,620

(22) Filed: Oct. 4, 2022

(65) Prior Publication Data
US 2024/0112481 A1    Apr. 4, 2024

(51) Int. Cl.
*G06V 30/14* (2022.01)
*G06N 20/20* (2019.01)
*G06V 30/19* (2022.01)

(52) U.S. Cl.
CPC ....... *G06V 30/19107* (2022.01); *G06N 20/20* (2019.01); *G06V 30/14* (2022.01)

(58) Field of Classification Search
CPC .. G06V 30/19107; G06V 30/14; G06V 30/41; G06N 20/20
USPC .......................................... 382/155
See application file for complete search history.

(56) References Cited

U.S. PATENT DOCUMENTS

| | | | |
|---|---|---|---|
| 11,593,740 B1* | 2/2023 | Chan | G06Q 10/0633 |
| 11,847,599 B1* | 12/2023 | Chan | G06Q 10/06311 |
| 2023/0377004 A1* | 11/2023 | Nair | G06N 20/20 |
| 2024/0152933 A1* | 5/2024 | Lin | G06Q 10/06393 |
| 2024/0296654 A1* | 9/2024 | Alwanni | G06V 10/774 |

* cited by examiner

*Primary Examiner* — Negussie Worku
(74) *Attorney, Agent, or Firm* — Buckley, Maschoff & Talwalkar LLC

(57) ABSTRACT

Systems and methods include acquisition of a first image of a first activity record, determination of first text based on the first image, generation of a first embedding based on the first text, generation of a second embedding based on the first embedding using a first model, where a number of dimensions of the second embedding is less than a number of dimensions of the first embedding, determination of a first cluster based on the second embedding using a second trained model, the second trained model trained using unsupervised learning, and determination of a first activity type associated with the first activity record based on the first cluster, the second embedding and historical activity data associating the first cluster with a plurality of activity types and each of the plurality of activity types with a respective embedding metric.

20 Claims, 11 Drawing Sheets

500

| User ID | Org ID | Cluster | Activity Type | Occurrences | Embedding Mean | Embedding Std Dev |
|---|---|---|---|---|---|---|
| | | | | | | |

*FIG. 5*

ACTIVITY CLASSIFICATION USING UNSUPERVISED MACHINE LEARNING

BACKGROUND

Software applications, executed on-premise or in the cloud, have profoundly increased human efficiency. For example, software applications may be used to automate tasks which were previously performed manually. Such automations are limited since many manual tasks include a degree of human judgment which cannot be easily represented in software.

Improvements in machine learning have increased the types of tasks which may be reliably performed by software applications. This is primarily due to the fact that a software developer need not develop and code logic for performing such a task, but must simply train a machine learning model to perform the task using input training data. Once trained, the machine learning model may be operated to perform the task on new input data.

Supervised machine learning is a type of model training which uses many sets of training data. Each set of training data (e.g., a row of sales data) is associated with a ground truth (e.g., a profit value). Sets of training data are input to a machine learning model, which generates an output (a value, a classification, etc.) for each set. The outputs are compared with the ground truths corresponding to each input set of training data and the model is modified based on the comparison. The process repeats until the outputs of the model match the ground truths to a suitable degree.

Supervised learning therefore requires a ground truth, or label, for each set of training data. In the case of a classification model, the ground truths consist of classification types which may be output by the trained model. A classification model trained using supervised learning cannot output a classification type which was not associated with a ground truth of any set of training data. Accordingly, classification models may be unsuitable for environments in which classification types may be added after training of the classification model. Moreover, classification models trained based on training data of one organization may be unsuitable for deployment within another organization, particularly if a particular set of data would be classified as one classification type in the first organization but as another classification type in the other organization.

Systems are desired to provide a machine learning-trained classification system which is suitable for use by different organizations and capable of handling new classification types.

BRIEF DESCRIPTION OF THE DRAWINGS

FIG. 5 is a tabular representation of historical activity type data according to some embodiments.

DETAILED DESCRIPTION

The following description is provided to enable any person in the art to make and use the described embodiments. Various modifications, however, will remain readily-apparent to those in the art.

Some embodiments provide classification of an activity type represented by an image, for example, an image of a physical sales receipt. Advantageously, the classification is based both on machine learning models and on historical data. The historical data facilitates user-specific mapping of model outputs to activity types. Embodiments may therefore allow different users and organizations to use the same trained models for activity classification.

Generally, embodiments extract text from an image and generate a multi-dimensional embedding based on the text. A clustering algorithm trained using unsupervised learning then determines a cluster based on the embedding. The cluster and embedding are used to identify an activity type by comparing the cluster and embedding to historical data which associates a subject user and/or organization with clusters, embeddings and activity types.

Embodiments may be more flexible and accurate than systems in which activity types are identified using a hard-coded keyword search. Embodiments generally include less hard-coded logic than conventional systems. Moreover, the hard-coed logic which exists is easier to understand and maintain.

Supervised learning relies heavily on multiple distinct sets of historical data. These sets must be maintained and updated, and the model regularly retrained based thereon. Some embodiments, on the other hand, require only one set of historical data.

Figure 1:
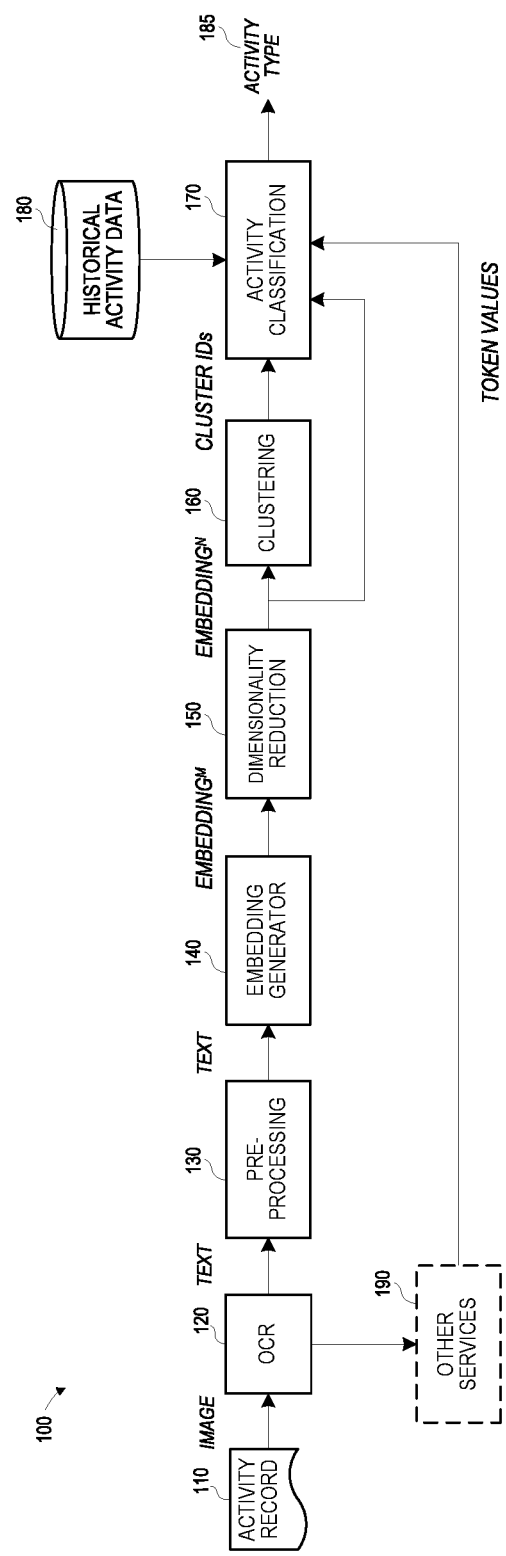
FIG. 1 is a block diagram of a system to determine an activity type based on an activity record according to some embodiments.

FIG. 1 is a block diagram of system 100 according to some embodiments. Each illustrated component of system 100 may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more components of system 100 are implemented by a single computing device, and/or two or more components of system 100 are co-located. One or more components of system 100 may be implemented using cloud-based resources, and/or other systems which apportion computing resources elastically according to demand, need, price, and/or any other metric.

Activity record 110 may comprise any text associated with an activity, represented using any suitable medium. The text may include, but is not limited to, a description of the activity, a date and time of the activity, and a cost associated with the activity. The text may be itemized, with each item associated with its own description and related cost. Activity record 110 may comprise a paper receipt printed by an electronic printer (e.g., a credit card terminal, a laser printer), a graphical image displayed on a display (e.g., a computer monitor, a smartphone screen), or other visually-perceptible entity. Examples of activity record 110 include but are not limited to a credit card receipt, a hotel bill, and an e-mailed transaction confirmation.

Optical Character Recognition (OCR) component 120 receives an image of activity record 110. The image may be a picture captured by a camera operated by a user. If activity record 110 exists in digital form, the digital form may be directly transmitted to OCR component 120 without capturing an image thereof using a camera. In some embodiments which will be described in detail below, the user may access an activity classification service to submit the image of activity record 110 to OCR component 120, where the remaining components of system 100 are implemented by the service.

OCR component 120 converts the image of activity record 110 to text as is known in the art. OCR component 120 may comprise a generally-available cloud-based OCR service but embodiments are not limited thereto. The text is cleaned and pre-processed by pre-processing component 130 to reduce redundancies and delete stop words and escape characters that may exist therein. Pre-processing component 130 may comprise a regex function which serves to denoise the received text.

Embedding generator 140 determines a multi-dimensional embedding based on the text output by pre-processing component 130. An embedding is a multidimensional vector which comprises a value for each dimension. Embedding generator 140 may utilize a transformer-based model which takes into consideration the text as well as the context and representation thereof. Some embodiments of embedding generator 140 utilize a pre-trained off-the-shelf model such as a Hugging Face Bidirectional Encoder Representations from Transformers (BERT) model.

Embedding generator 140 generates an embedding having M (e.g., 768) dimensions. Dimensionality reduction component 150 reduces the dimensionality of the embedding to N (e.g., 25) dimensions, where N<M. Such a reduction reduces the complexity of subsequent steps and storage requirements.

Dimensionality reduction component 150 reduces the dimensionality while maintaining distances between embeddings. For example, if two embeddings generated by embedding generator 140 based on different texts are far from (or close to) each other in embedding space, their dimension-reduced counterparts generated by component 150 will also be far from (or close to) each other in the dimension-reduced embedding space. Dimensionality reduction component 150 may be implemented using a Uniform Manifold Approximation and Projection (UMAP)-based model but embodiments are not limited thereto. As will be described below, dimensionality reduction component 150 is trained based on historical activity records and associated activity types.

Clustering component 160 determines one or more clusters based on the embedding generated by component 150. More specifically, in some embodiments, clustering component 160 assigns a probabilistic cluster assignment to an input embedding such that similar embeddings are assigned to a same or similar cluster and different embeddings are assigned to different clusters. Clustering component 160 may comprise a Gaussian Mixture Model which is trained using unsupervised learning, an example of which will be described below.

Identifiers of one or more determined clusters and their associated probabilities are received by activity classification component 170. Activity classification component 170 uses historical data 180 to determine activity type 185 associated with activity record 110. Generally, activity classification component 170 attempts to identify a portion of historical data 180 which is associated with a current user or organization (e.g., a user or organization associated with activity record 110) and with one of the received cluster identifiers (e.g., the cluster identifier associated with the highest probability). This portion, as will be described below, specifies activity types and associated embedding information which are used to determine activity type 185. More details of operation of activity classification component 170 according to some embodiments will be provided below. For example, other services 190 may generate token values based on the text output by OCR component 120, and activity classification component 170 may use these token values in the determination of activity type 185.

Figure 2:
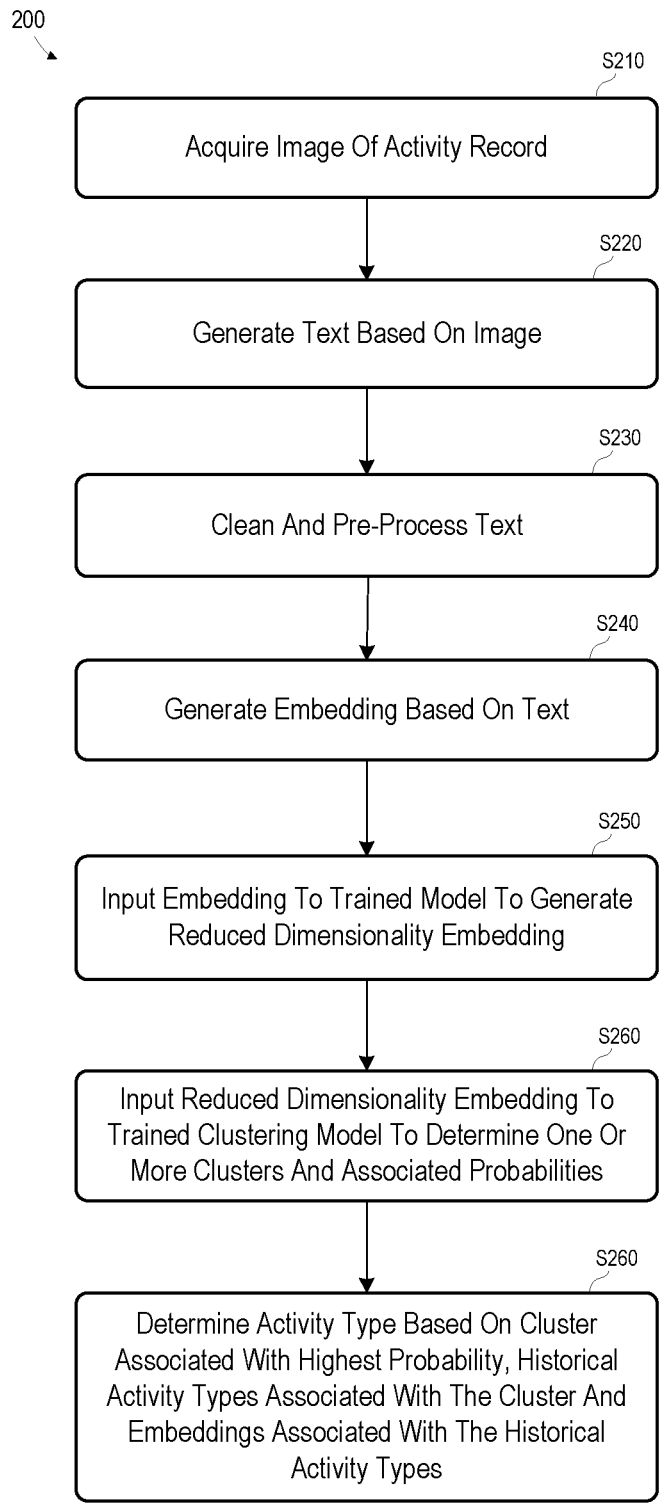
FIG. 2 is a flow diagram of a process to determine an activity type based on an activity record according to some embodiments.

FIG. 2 is a flow diagram of a process to determine an activity type based on an activity record according to some embodiments. Process 200 may be performed using any suitable combination of hardware and software. Software program code embodying this process may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Process 200 may be initiated by a user request for an activity type determination. The request may comprise a request to submit a record of an activity along with data identifying an activity type associated with the record. In one example, the activity record is a receipt and the user initiates generation of an expense report which is to include the activity and an expense category corresponding to the activity. Process 200 may therefore by executed to automatically determine the corresponding expense category.

Initially, at S210, an image of an activity record is acquired. The image may be a picture of a receipt captured by a smartphone, a digital copy of a receipt or other purchase confirmation, etc. The image conforms to a format suitable for input to an OCR system used at S220 to generate text based on the image. The text is cleaned and pre-processed at S230. Such cleaning may denoise the text by reducing redundancies and deleting stop words and escape characters.

A multi-dimensional embedding is generated based on the cleaned and pre-processed text at S230. The multi-dimensional embedding may be generated using a trained text-to-embedding model as is known in the art. In some embodiments, the text is input to a transformer-based model such as a BERT model. The embedding is input to a trained model at S250 to generate a reduced dimensionality embedding. The model is trained such that activity records associated with a same activity type result in similar reduced-dimensionality embeddings.

Figure 3:
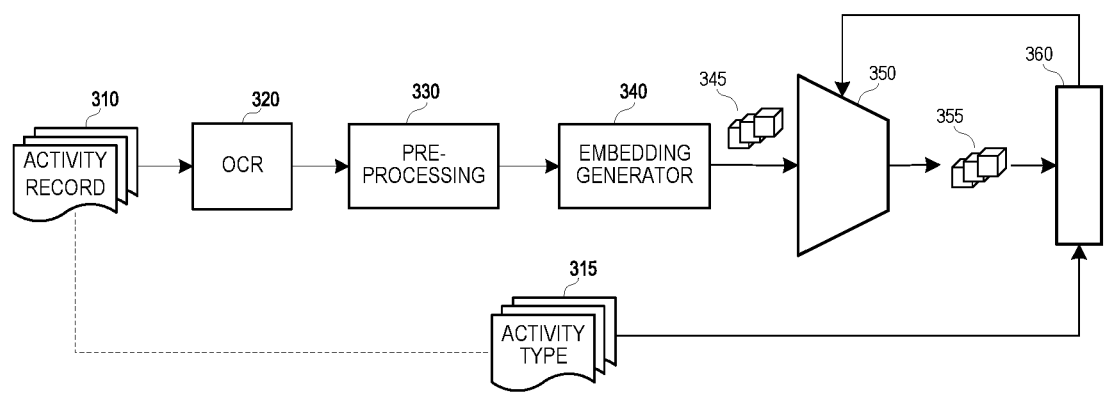
FIG. 3 is a block diagram of a system to train a dimensionality-reducing model according to some embodiments.

FIG. 3 illustrates training of a dimensionality reduction model according to some embodiments. Model 350 may comprise any type of learning network that is or becomes known, such as a statistical model, a learning algorithm or a neural network. Model 350 may comprise a network of nodes which receive input, change internal state according to that input, and produce output depending on the input and internal state. The output of certain nodes is connected to the input of other nodes to form a directed and weighted graph. The weights as well as the functions that compute the internal state can be modified via training as will be described below.

Model 350 is trained based on historical activity records 310. Activity records 310 may comprise any type of documents and/or images, and may reflect an assortment of the types of documents and images which are expected to be received by system 100 during deployment. Each of activity records 310 is associated with a known activity type 315. The activity type 315 associated with an activity record 310 is known as the "ground truth" of the record 310.

Training of model may comprise execution of training iterations. One iteration according to some embodiments may include inputting a batch of activity records 310 to OCR component 320, pre-processing the resulting text using pre-processing component 330 and generating embeddings 345 using embedding generator 340. OCR component 320, pre-processing component 330 and embedding generator 340 may be identical to the corresponding components used during deployment of trained model 350 within system 100. Embeddings 345 are input to model 350, which generates dimensionality-reduced embeddings 355 based on its structure (i.e., hyperparameters) and initial node weights.

Each dimensionality-reduced embedding 355 corresponds to one activity record 310 and therefore also to an activity type 315 associated with that activity record 310. Loss layer 360 compares dimensionality-reduced embeddings 355 based on their corresponding activity types 315 to determine a total loss. The total loss reflects the degree to which embeddings 355 corresponding to a same activity type 315 are similar and the degree to which embeddings 355 corresponding to different activity types 315 are dissimilar. Loss layer 360 may implement any suitable loss function or other algorithm to determine a total loss based on embeddings 355 based on their corresponding activity types 315. Model 350 is modified based on the determined total loss. The modification is intended to reduce the total loss.

The above-described process continues until the performance of model 350 is deemed satisfactory. Performance may be evaluated with respect to test activity records which were not used in the training of model 350 and their corresponding activity types. Determination of model performance may include determination of any one or more metrics of model accuracy, precision, etc. that are or become known.

Returning to process 200, the reduced dimensionality embedding generated by the trained model at S250 is input to a trained clustering model at S260. The trained clustering model determines one or more clusters and associated probabilities based on the input reduced dimensionality embedding. The probabilities may be calibrated or uncalibrated according to some embodiments.

Figure 4:
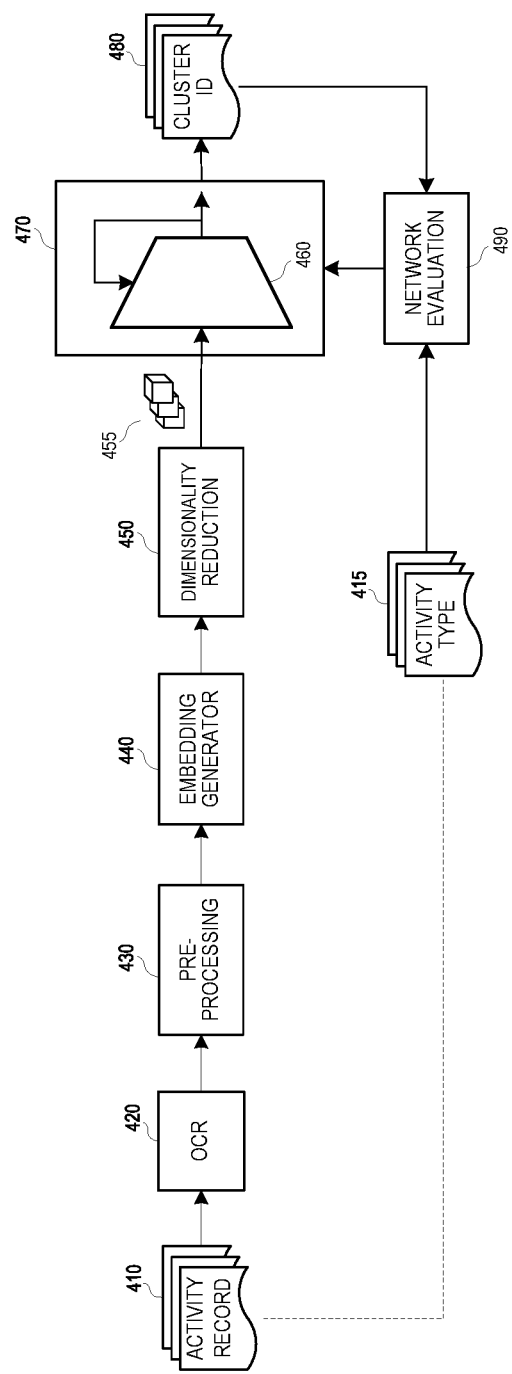
FIG. 4 is a block diagram of a system to train a clustering model according to some embodiments.

FIG. 4 illustrates training of a clustering model according to some embodiments. Model 460 may comprise any type of learning network that is or becomes known, such as a statistical model, a learning algorithm or a neural network. Model 460 may comprise a network of nodes as described above. According to some embodiments, model 460 comprises a Gaussian Mixture Model which is trained using unsupervised learning.

Model 460 is trained based on historical activity records 410, each of which is associated with a known activity type 415. Dimensionality reduction component 450 comprises a trained model as described with respect to FIG. 3. Activity records 410 may include the same activity records which were used to train dimensionality reduction model 450 in some embodiments.

During training, a batch of activity records 410 is input to OCR component 420, the resulting text is pre-processed by pre-processing component 430, and embedding generator 440 generates embeddings based on the pre-processed text. The embeddings are input to trained dimensionality reduction model 450 to generate embeddings 455.

Model 460 receives embeddings 455 and trains itself to learn a mapping from an embedding to an associated embedding cluster as is known in the art. In some embodiments, model 460 outputs one or more cluster identifiers for an input embedding and associates each identifier with a probability that the embedding belongs to that cluster. The mapping is intended to associate similar embeddings with a same cluster. The clusters and the mapping are determined without reference to any ground truths associated with embeddings 455. The training of model 460 may be controlled by unsupervised learning component 470 as is known in the art.

Upon completion of training, network evaluation component 490 may evaluate performance of trained model 460 by inputting activity records to the FIG. 4 pipeline, receiving resulting cluster identifiers 480, and determining whether the cluster identifiers are suitable in view of the activity types associated with the input activity records. If not, component 490 may modify the hyperparameters of model 460 and initiate re-training of the modified model 460.

At S260, an activity type is determined based on an identified cluster, historical activity types associated with the cluster, and embeddings associated with the historical activity types. Generally, several historical activity types associated with the cluster may be identified from historical activity data, and the embeddings of the identified historical activity types are compared to the embedding generated at S250 to identify one of the historical activity types. Advantageously, the historical activity data may be filtered according to user and/or organization, such that the several identified historical activity types associated with the cluster and their embeddings are user and/or organization-specific. The foregoing may allow for different activity types to be determined based on a same activity record, depending on the user and/or organization for which the activity type is being determined.

FIG. 5 is a tabular representation of historical activity data 500 which may be used at S260 in some embodiments. Data 500 may comprise an implementation of data 180 of FIG. 1. Embodiments are not limited to the contents or structure of data 500.

As shown, data 500 consists of rows associating a cluster and activity type with a user identifier and an organization identifier. In some implementations, a particular user identifier may be included within many rows of data 500, each of which includes a different activity type and a cluster associated with that activity type. For each activity type of a row, data 500 indicates a number of occurrences for which the activity type was determined for the user of the row, as well as the mean and the standard deviation of the embedding values corresponding to those occurrences. Historical activity data used at S260 need not be structured in a tabular format. Any data structure or structures may be used which associates users and organizations with clusters, activity types, and metrics such as occurrences, means and standard deviations.

Historical activity data is not limited to the data of FIG. 5. For example, activity types and their associated metrics for a given user/organization may be associated with additional attributes (e.g., cost range, time of day) which allow identification of only those activity types which meet certain criteria.

Figure 6A:
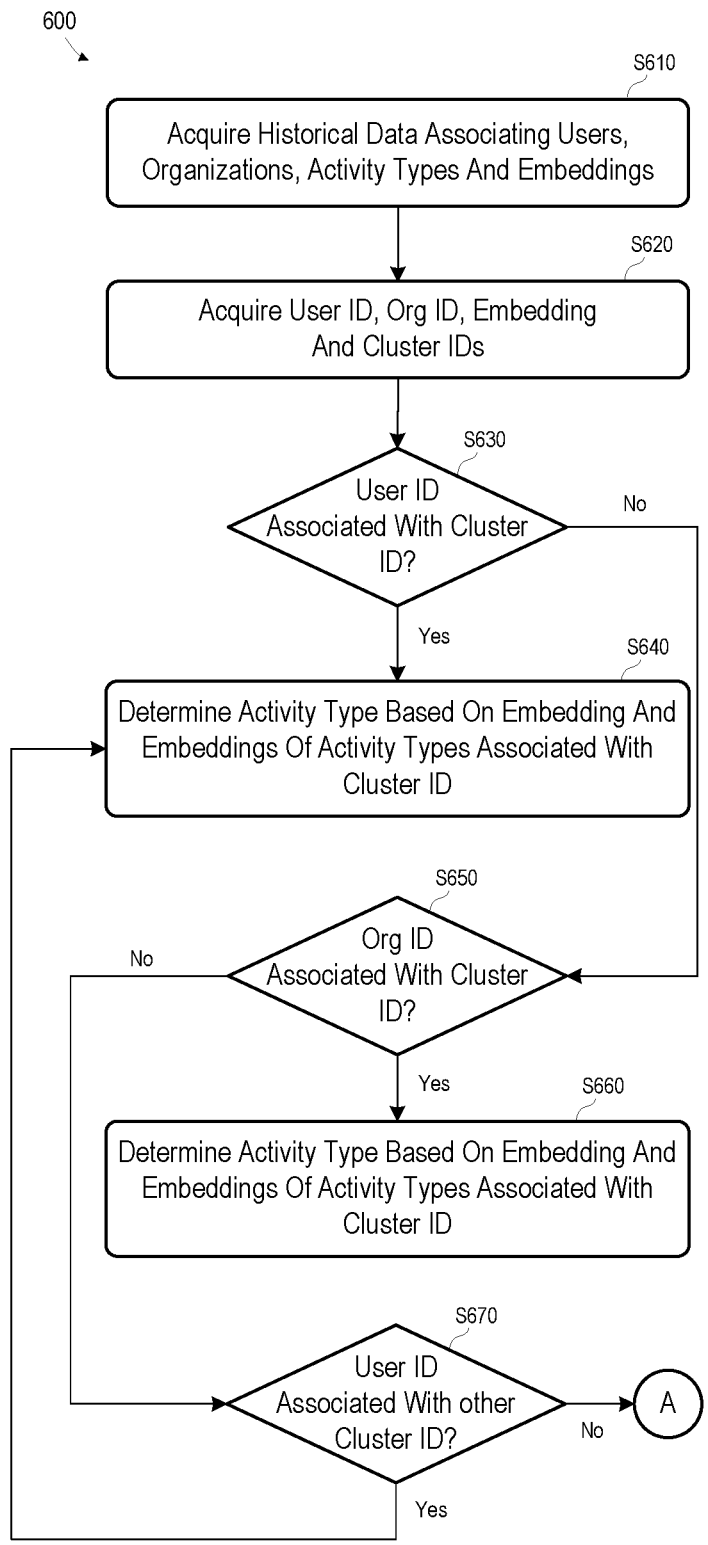
FIGS. 6A and 6B comprise a flow diagram of a process to determine an activity type based on a one or more cluster IDs, associated embeddings, and historical activity type data based on an activity record according to some embodiments.
Figure 6B:
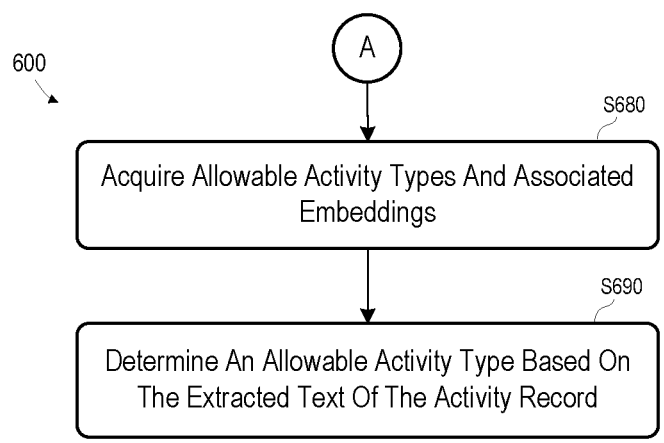

FIGS. 6A and 6B comprise a flow diagram of process 600 according to some embodiments. Process 600 may comprise an implementation of S260 of process 200, but embodiments are not limited thereto. Accordingly, process 600 assumes that an embedding has been generated and a cluster has been determined based on the embedding.

Historical data is acquired at S610. The historical data associates users, organizations, activity types and embeddings. Generally, the historical data allows identification of activity types which have previously been determined for a given user or organization, based on the cluster associated with the activity types and the cluster identified at S260. Moreover, the historical data provides data regarding the embeddings which were used to determine the activity types, so that one of the activity types may be identified based on the embedding generated at S250. As noted above, embeddings may be associated with an activity type using a composite metric which represents all embeddings associated with an activity type for a given user (or organization).

A user identifier and an organization identifier are acquired at S620. The user identifier may identify a user associated with an input activity record, and the organization identifier identifies an employer or other organization to which the user belongs. The organization identifier may identify a tenant of a software application which executes processes 200 and 600.

An embedding generated based on the input activity record and one or more cluster identifiers are also acquired at S620. The one or more cluster identifiers may represent cluster identifiers output by a trained clustering model, and each cluster identifier may be associated with a probability as is known in the art.

At S630, it is determined whether the historical data associates the user identifier with the cluster identifier that is associated with the highest probability. In one example, the historical data is searched for the user identifier to determine whether any rows including the user identifier and the cluster identifier exist. If so, flow proceeds to S640 to determine an activity type based on the embedding and on embeddings of activity types associated with the cluster identifier.

For example, all activity types associated with the cluster identifier in the historical data are determined. From these determined activity types, an activity type is determined which is associated with embedding data that is most similar to the embedding data acquired at S620. The similarity may be based both on a distance from the acquired embedding to the mean embeddings associated with the activity types and on a comparison of the standard deviations of the embeddings associated with the activity types to the distance. In some embodiments, the determined activity type is the activity type associated with a mean embedding closest to the acquired embedding and for which the acquired embedding falls within the standard deviation from the mean embedding.

Determination of the activity type may be based on additional or alternative historical data associated with the cluster identifier and activity types. The determined activity type may be the activity type associated with the cluster identifier and with the greatest number of occurrences. The number of occurrences may be considered along with the mean embeddings and the standard deviations. For example, the number of occurrences may provide a weighting which reduces the contribution of the standard deviation to the determination for activity types having a low number of occurrences. In another example, a score for each activity type may be determined based on a comparison of the mean embedding and standard deviation to the acquired embedding, and may be then weighted based on the number of occurrences of the activity type, where a greater number of occurrences results in a greater weighting.

In some embodiments, the determination at S640 considers values generated by different services (or by the same service). For example, a second service may analyze the text output from the OCR component to determine an amount and/or a time associated with the input activity record. These values may be used to identify specific subsets of the embedding metrics which are associated with the activity types associated with the cluster, as long as the historical activity data may be filtered based on these values. In a case that a time associated with the input activity record is available, S640 may include determination, for each activity type, of the mean of all embeddings associated with a similar activity time period (e.g., evening) and the standard deviation of those embeddings. Similarly, if an amount associated with the input activity record is available, S640 may include determination, for each activity type, of the mean of all embeddings associated with a similar activity amount (e.g., between $20 and $50) and the standard deviation of those embeddings.

Flow proceeds from S630 to S650 if it is determined that the historical data does not associates the user identifier with the cluster identifier that is associated with the highest probability. At S650, it is determined whether the historical data associates the organization identifier with the cluster identifier that is associated with the highest probability. If so, flow proceeds to S660 to determine an activity type based on the embedding and on embeddings of activity types associated with the organization identifier.

Accordingly, all activity types associated with the organization identifier in the historical data and their associated metrics are determined. The historical data may maintain the metrics for each activity type on an organization level, or such metrics may be determined on-the-fly based on the activity types and metrices associated with all customer identifiers which are also associated with the organization identifier. The activity type may be determined at S660 based on the acquired embedding and the metrics of the determined activity types as described above with respect to S640.

Flow continues from S650 to S670 if the historical data does not associate the organization identifier with the cluster identifier that is associated with the highest probability. At S670, it is determined whether the user identifier is associated with another one of the cluster identifiers acquired at S620 (if any). For example, it is first determined whether the user identifier is associated with the acquired cluster identifier associated with the second-highest probability. If not, it is then determined whether the user identifier is associated with the acquired cluster identifier associated with the third-highest probability. Embodiments may limit the determination at S670 to a particular number (e.g., 2) of cluster identifiers.

If the determination at S670 is negative, all allowable activity types and their associated embeddings are acquired at S680. The allowable activity types may be acquired from a list that is maintained by an application provider. The extracted and pre-processed text of the activity record to perform a semantic search (e.g., provided by a third-party service) of the allowable activity types at S690 to determine a similar activity type.

Once an activity type is determined based on an activity record as described above, the historical activity data may be updated based on the activity type. The update may increment the number of occurrences associated with the activity type and the user identifier (and the cluster identifier if used) and recalculate the associated embedding metrics based on the current embedding.

Figure 7:
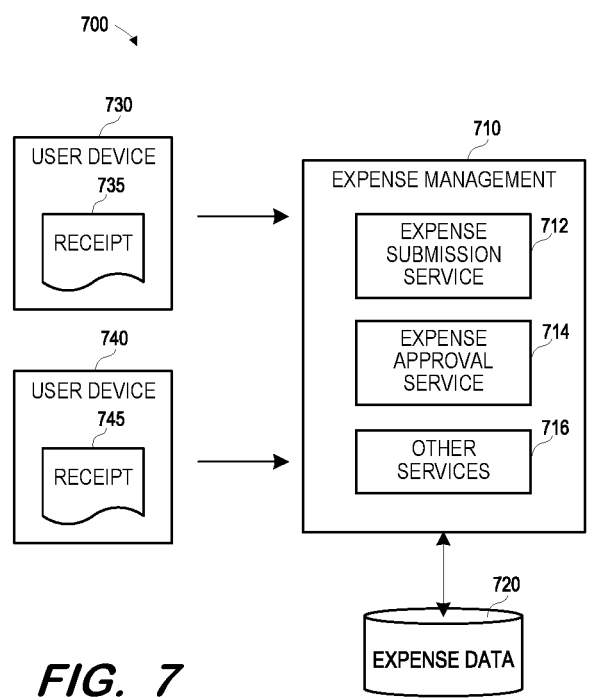
FIG. 7 is a block diagram of a system to determine an expense type based on receipt images according to some embodiments.

FIG. 7 is a block diagram of system 700 according to some embodiments. System 700 may comprise an implementation of some embodiments for determining an expense type (i.e., an activity type) based on a receipt (i.e., an activity record).

System 700 includes expense management component 710, which may comprise a standalone application or a component of a suite of applications. Expense management component 710 may comprise a cloud service in some embodiments. Expense management component 710 includes expense submission service 712 which may comprise program code executable to cause expense management component 710 to perform process 200 and/or process 600.

For example, a first user may operate user device 730 to submit receipt image 735 to expense submission service 712. Similarly, a second user may operate user device 740 to submit receipt image 745 to expense submission service 712. Each of user devices 730 and 740 may execute client applications (e.g., JAVA applications executed by a Web browser) for communicating with expense submission service 712. In response to receipt image 735, expense submission service 712 determines an expense type based on historical data associated with the first user. Expense submission service 712 determines an expense type based on historical data associated with the second user in response to receipt image 745. The determined expense types may be used to complete corresponding expense reports without requiring either user to determine an expense type which corresponds to their uploaded receipt.

Expense management component 710 of the present embodiment also includes expense approval service 714 to manage a process for approving submitted expense reports. Other services 715 may provide other functionality related to expense management. Expense data 720 may store completed expense reports, as well as historical activity data used to determine expense type as described herein.

Figure 8:
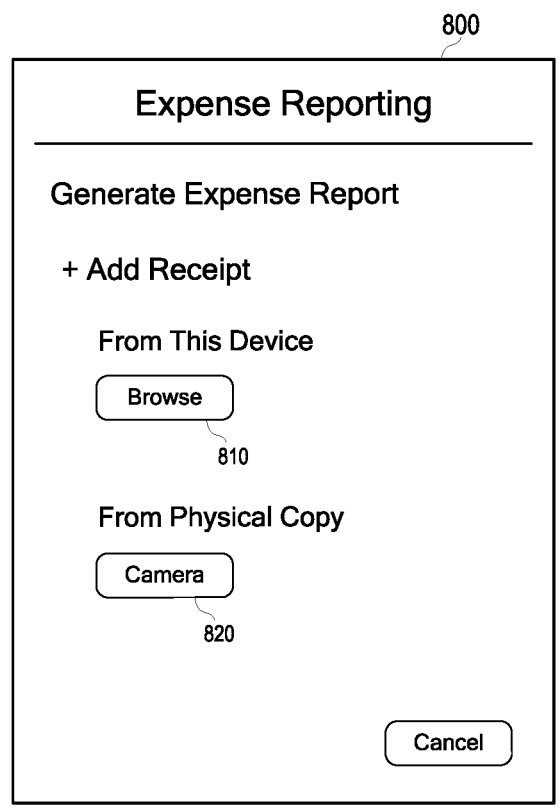
FIG. 8 illustrates a user interface of an expense reporting application for submitting a receipt according to some embodiments.

FIG. 8 illustrates a user interface of an expense reporting application according to some embodiments. Interface 800 may be presented by an application executing on a smartphone, laptop computer or desktop computer, for example. Interface 800 may comprise a Web page provided by a cloud-based server application for display by a Web browser. Interface 800 may also comprise a user interface of a standalone local application. Embodiments are not limited to the format or content of interface 800.

Figure 9:
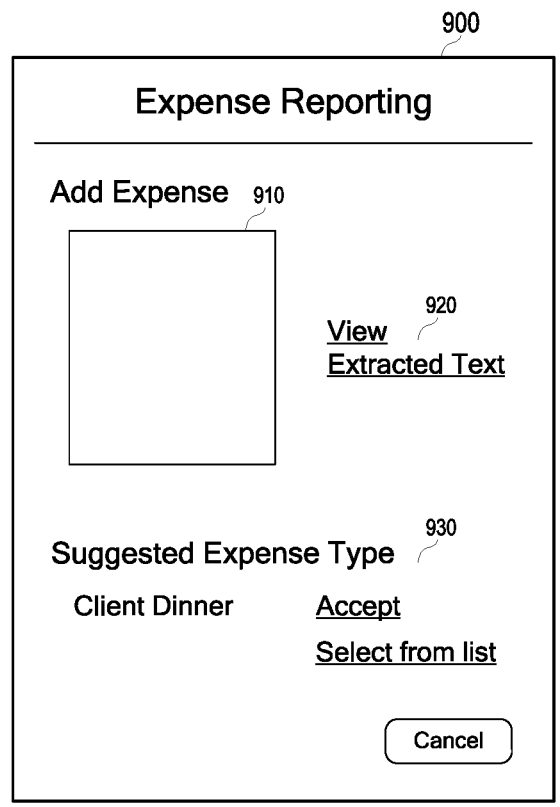
FIG. 9 illustrates a user interface of an expense reporting application presenting suggested expense types according to some embodiments.

Interface 800 is used to add an expense to an expense report based on a receipt of the expense. The user may select icon 810 to select an image file of a receipt which is stored on the device which presents interface 800, or may select icon 820 to capture an image of a receipt for upload. The selected or captured image may then be sent to a remote service via Web service or API calls. The remote service operates as described above to generate text based on the image, generate embeddings based on the text, and to determine an activity type (e.g., an expense type) based on the embeddings and on historical activity data. Interface 900 of FIG. 9 may be displayed after determination of the activity type.

Interface 900 presents the selected or captured receipt image 910, and includes link 920 to the text extracted therefrom. Area 930 of interface 900 presents an activity type (i.e., "Client Dinner") determined based on receipt image 910 as described above. Selection of the "Accept" link may result in population of an entry of an expense report having the expense type "Client Dinner". Alternatively, selection of the "Select from list" link may result in presentation of a list of expense types from which the user may select an expense type. The list may be generated based on the list of user- or organization-specific allowable activity types mentioned above. As also mentioned above, other services may process the receipt image to determine values of other fields of the expense report entry, such as amount and date.

Figure 10:
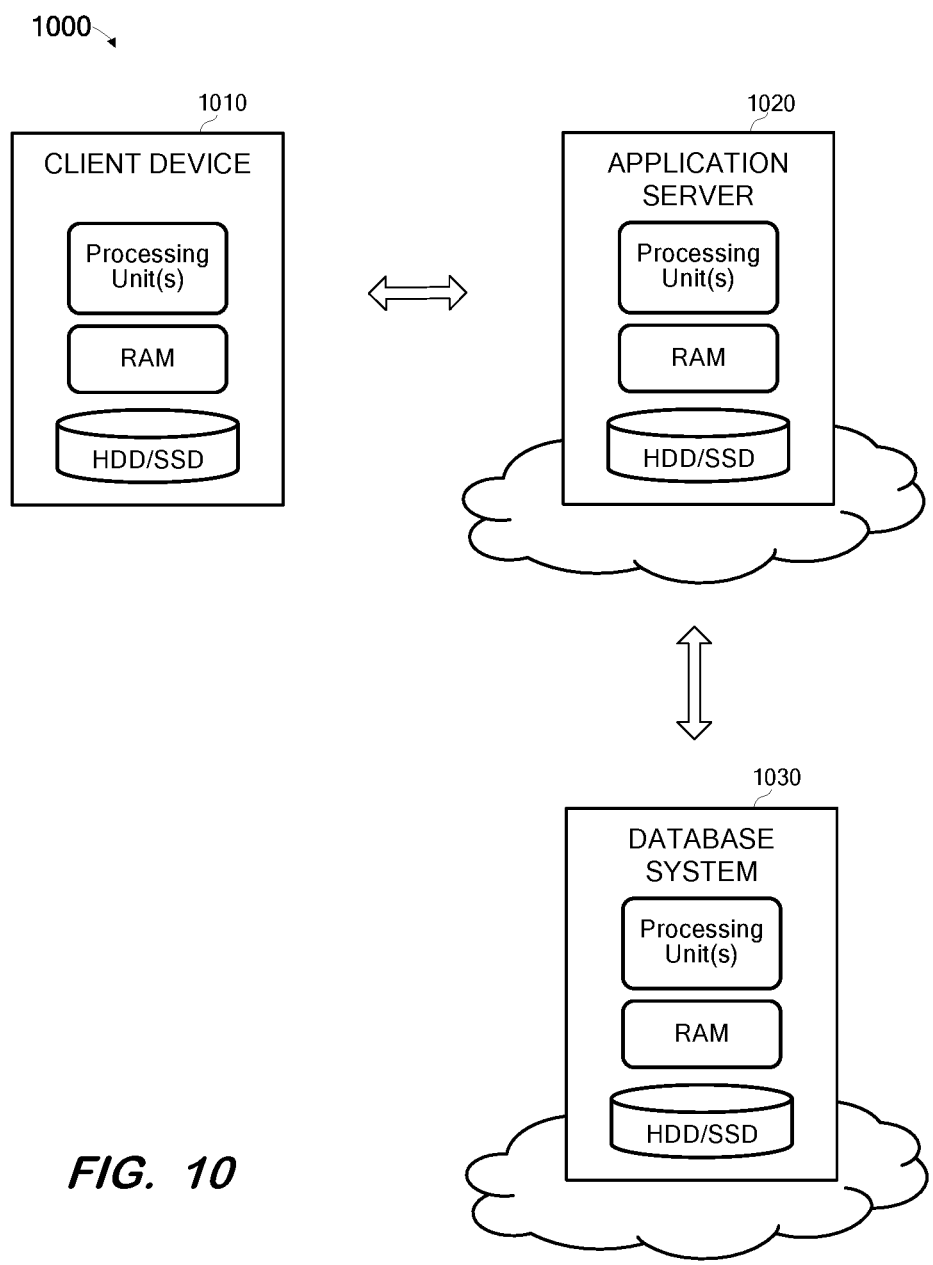
FIG. 10 is a block diagram of computing systems implementing a system according to some embodiments.

FIG. 10 is a block diagram of cloud-based system 1000 according to some embodiments. In this regard, application server 1020 and database system 1030 may comprise cloud-based compute resources, such as virtual machines, allocated by a public cloud provider providing self-service and immediate provisioning, autoscaling, security, compliance and identity management features.

Client device 1010 may interact with user interfaces of a service or application executing on application server 1020, for example via a Web browser executing on client device 1010. These user interfaces may provide the ability to upload an activity record and receive an activity type determined by the service or application based thereon. Application server 1020 may communicate with database system 1030 to retrieve and update historical activity data during and after this determination as described above.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of architectures described herein may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:
a memory storing processor-executable program code; and
a processing unit to execute the processor-executable program code to cause the system to:
acquire a first image of a first activity record;
determine first text based on the first image;
generate a first embedding based on the first text;
generate a second embedding based on the first embedding using a first model, where a number of dimensions of the second embedding is less than a number of dimensions of the first embedding;
determine a first cluster based on the second embedding using a second trained model, the second trained model trained using unsupervised learning; and
determine a first activity type associated with the first activity record based on the first cluster, the second embedding and historical activity data associating the first cluster with a plurality of activity types and each of the plurality of activity types with a respective embedding metric.

2. A system according to claim 1, wherein the first activity record is associated with a first user, and wherein determination of the first activity type is based on historical activity data associating the first user with the first cluster.

3. A system according to claim 2, wherein determination of the first activity type associated with the first activity record comprises comparing the second embedding to the respective embedding metric associated with each of the plurality of activity types and determination of one of the plurality of activity types based on the comparison.

4. A system according to claim 1, wherein determination of the first activity type associated with the first activity record comprises comparing the second embedding to the respective embedding metric associated with each of the plurality of activity types and determination of one of the plurality of activity types based on the comparison.

5. A system according to claim 4, the processing unit to execute the processor-executable program code to cause the system to update the embedding metric associated with the determined first activity type based on the second embedding.

6. A system according to claim 1, wherein the first activity record is associated with a first user and a first organization, wherein determination of the first activity type comprises determination that the historical activity data does not associate the first user with the first cluster, and wherein determination of the first activity type is based on historical activity data associating the first organization with the first cluster.

7. A system according to claim 1, wherein the first model is trained based on the historical activity data.

8. A computer-implemented method, comprising:
determine first text based on a first activity record;
generate a first embedding based on the first text;
generate a second embedding based on the first embedding using a first model, where a number of dimensions of the second embedding is less than a number of dimensions of the first embedding;
determine a first cluster based on the second embedding using a second trained model;
determine a first activity type associated with the first activity record based on the first cluster, the second embedding and historical activity data associating the first cluster with a plurality of activity types and each of the plurality of activity types with one or more respective embedding metrics; and
populate a report to associate the first activity record with the first activity type.

9. A method according to claim 8, wherein the first activity record is associated with a first user, and wherein the first activity type is determined is based on historical activity data associating the first user with the first cluster.

10. A method according to claim 9, wherein determining the first activity type associated with the first activity record comprises comparing the second embedding to the respective embedding metric associated with each of the plurality of activity types and determining one of the plurality of activity types based on the comparison.

11. A method according to claim 8, wherein determining the first activity type associated with the first activity record comprises comparing the second embedding to the respective embedding metric associated with each of the plurality of activity types and determining one of the plurality of activity types based on the comparison.

12. A method according to claim 11, further comprising updating the embedding metric associated with the determined first activity type based on the second embedding.

13. A method according to claim 8, wherein the first activity record is associated with a first user and a first organization, wherein determining the first activity type comprises determining that the historical activity data does not associate the first user with the first cluster, and wherein the first activity type is determined based on historical activity data associating the first organization with the first cluster.

14. A method according to claim 8, wherein the first model is trained based on the historical activity data and the second model is trained using unsupervised learning.

15. A non-transitory computer-readable medium storing program code executable by a processing unit of a computing system causes the computing system to:
determine first text based on a first activity record;
generate a first embedding based on the first text;
generate a second embedding based on the first embedding using a first model, where a number of dimensions of the second embedding is less than a number of dimensions of the first embedding;
determine a first cluster based on the second embedding using a second trained model; and
determine a first activity type associated with the first activity record based on the first cluster, the second embedding and historical activity data associating the first cluster with a plurality of activity types and each of the plurality of activity types with one or more respective embedding metrics.

16. A medium according to claim 15, wherein the first activity record is associated with a first user, and wherein the first activity type is determined is based on historical activity data associating the first user with the first cluster.

17. A medium according to claim 16, wherein determination of the first activity type associated with the first activity record comprises comparing the second embedding to the respective embedding metric associated with each of the plurality of activity types and determination of one of the plurality of activity types based on the comparison.

18. A medium according to claim 17, the program code executable by a processing unit of a computing system to causes the computing system to update the embedding metric associated with the determined first activity type based on the second embedding.

19. A medium according to claim 15, wherein the first activity record is associated with a first user and a first organization, wherein determination of the first activity type comprises determination that the historical activity data does not associate the first user with the first cluster, and wherein the first activity type is determined based on historical activity data associating the first organization with the first cluster.

20. A medium according to claim 15, wherein the first model is trained based on the historical activity data and the second model is trained using unsupervised learning.

* * * * *